Figure 1:
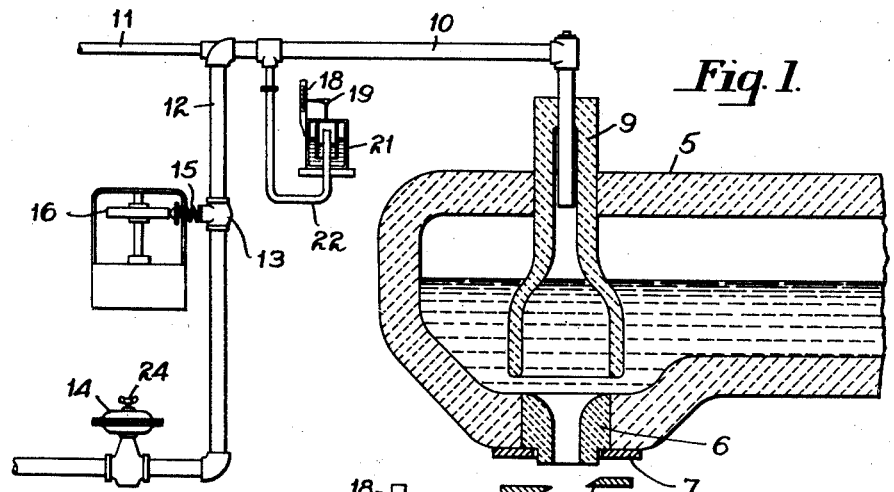

May 29, 1934.  A. H. STEWART  1,961,093
GLASS FEEDING APPARATUS
Filed Jan. 21, 1933

INVENTOR
Andrew H. Stewart,
By Archworth Martin,
Attorney.

Patented May 29, 1934

1,961,093

UNITED STATES PATENT OFFICE 1,961,093

GLASS FEEDING APPARATUS

Andrew H. Stewart, Shields, Pa.

Application January 21, 1933, Serial No. 652,860

8 Claims. (Cl. 49—55)

My invention relates to apparatus for feeding molten glass, and particularly to that class of apparatus wherein gathers or mold charges of glass are supplied from a furnace boot or forehearth through an orifice located in the bottom of the boot. Certain features of the invention are, however, applicable also to other types of apparatus.

Some systems of feeding glass charges to molds, and particularly the feeding of charges for machine production, employ what are known as pneumatic feeders. In this type of feeder, the glass above the discharge orifice is subjected to pressure and suction alternately to effect expulsion and retraction or retarding of the glass. In other words, some pressure is applied to the surface of the glass to supplement gravity flow, and cause the extrusion of the glass which is sheared off to form mold charges. Suction is periodically applied at the surface of the glass to retard the flow at the time of the shearing operation, and to perhaps draw the glass back somewhat to effect a slight necking thereof at the shear line, or at least to prevent the glass piling on the shear blades.

In some of the older systems, pressure and suction was applied at the surface of the entire pool of glass contained in a receptacle or boot, but at present the more common procedure is to insert a bell into the forehearth, at a point directly above the orifice, with the lower edge of the bell immersed in the glass, but out of contact with the bottom of the forehearth. Suitable pressure and suction lines communicate with the interior of the bell, to create pressure and suction within the bell, and thereby control flow through the orifice.

In this last-mentioned system difficulty is experienced in maintaining a desired quantity of molten glass within the bell, unless the line through which pressure and suction is effected at the interior of the bell is periodically opened to the atmosphere during the cycles of operation, or a sealed-off quantity of air is moved back and forth in the bell, and in the line leading to the bell. The glass within the bell forms a seal at one end of the pressure suction system, while the air is confined at the other end of the system by a flexible diaphragm, a piston having snug-fitting engagement with its cylinder, or by a liquid seal.

In other words, in a pneumatic feeder, a balance must be maintained within the bell, so that the glass level therein will return to approximately the same level at the end of each pressure-suction cycle. If the various impulses are even slightly in excess of the suction movements, there is a cumulative or gradual building up of an excessive quantity of air within the bell which will cause blowing of a bubble from the bell, thus destroying the gob, or at least making a break in the stream of glass, which will result in imperfectly-formed mold charges. On the other hand, if the suction movements are too great relative to the pressure impulses, the molten glass will gradually rise or be drawn into the bell, thus clogging the fluid pressure line which leads into the upper part of the bell.

My invention has for one of its objects the provision of an improved and simplified form of apparatus for creating suction and pressure within a bell or other form of pneumatic feeding device, without necessarily employing the heretofore well-known balancing steps in the cycle of operations.

I provide an improved gauge for automatically indicating the glass level within the bell, so that the forming of bubbles or the choking-off of the air conduit can be avoided through regulations of pressure when the indicator shows an abnormal cumulative condition to exist in the bell.

Another object of my invention is to provide a glass-feeding apparatus of generally simplified and improved form.

Figure 2:
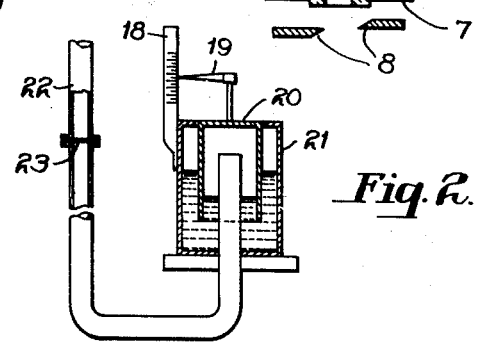
Figure 3:
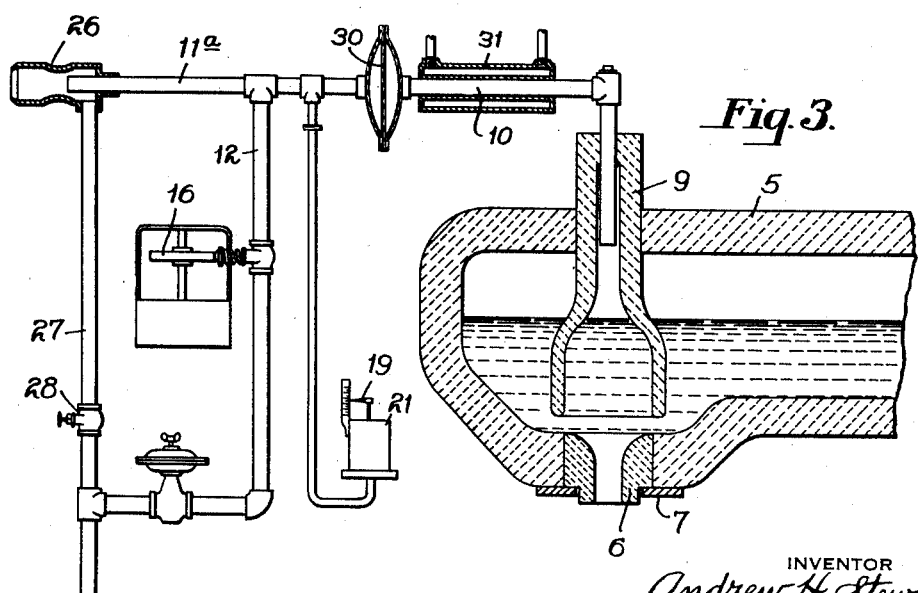

In the accompanying drawing, Figure 1 is a section view through a portion of a glass furnace boot and feeding apparatus; Fig. 2 is an enlarged view of a portion of the apparatus of Fig. 1, and Fig. 3 shows a modification of the structure of Fig. 1.

Referring first to Figs. 1 and 2, a furnace boot or forehearth is indicated by the numeral 5. A flow ring 6 is mounted in the bottom of the boot and is held in place as by a removable metal ring 7. Shear blades 8 are mounted beneath the orifice and may be operated in any suitable manner, in timed relation to the application of pressure and suction to the glass above the flow ring, as is common in structures of this character.

A bell 9 is positioned above the flow ring, with its lower edge slightly elevated so that glass may flow into the bell and through the flow ring. A conduit 10 communicates with the interior of the bell. A vacuum line 11 forms one branch of the conduit 10 and a pressure line 12 constitutes another branch thereof. A valve 13 controls flow through the pressure line 12, and a pressure regulator 14 is provided for automatically controlling the degree of pressure in the pipe 12. The regulator 14 is of any well-known adjustable type that is suitable for this purpose.

A spring 15 tends to hold the valve 13 in one extreme position, and the valve is operated against the spring by means of a cam disc 16, which is operated in any suitable manner, and in timed relation to movements of the shears 8. Suction may be created periodically in the line 11, in timed relation to operation of the valve 15, or such suction may be constant. In either case closure of the valve 15 will result in suction being created in the conduit 10, and opening movement of such valve will result in pressure being admitted to the pipe 10 in sufficient degree to overcome or destroy the suction, and to create a desired degree of pressure, it being noted that the suction line 11 is of much smaller diameter than are the pipes 10 and 12. The extent to which the valve 13 is opened, and the period of time which it is permitted to remain open is determined by the cam disc 16, the cam disc being of such contour and rotated at such rate of speed that desired periods of pressure, suction or balanced pressure within the pipe 12 is controlled by the adjustable regulator 14.

Where small charges of glass are to be formed and with the glass very hot, lower pressure or pressure of shorter duration is required than where the glass is stiffer, and larger charges are to be formed. Likewise, the degree and duration of suction will be varied to suit conditions. In either case, it is necessary to prevent the glass from being drawn too high into the bell and also to prevent the glass in the bell from being moved downwardly so far that a bubble is formed that will pass into the pool surrounding the bell, or be forced through the orifice. Thus, if the duration and degree of pressure within the bell is too great, the glass will be forced downwardly so far that bubbles will form, while if there is too great suction relative to pressure, the glass will be caused to rise in the bell so as to present an obstruction at the lower end of the conduit 10.

In order that the operator may constantly be informed regarding the glass level within the bell, I provide an indicator which includes a scale 18 and a pointer 19. The pointer 19 is mounted on a float 20 of the bell type which is supported by a body of liquid within the casing 21. A branch pipe 22 affords communication between the conduit 10 and the interior of the float 20, so that the bell 20 will rise and fall with fluctuations in pressure within the conduit 10. Thus, when pressure in the line 10 is reduced, the buoyancy of the bell 20 is lessened, so that the pointer 19 will move down the scale, while with increased pressure in the line 10, the bell will rise and the pointer 19 be moved upward. An orifice plate 23 is inserted in the line 22, so that the bell 20 will not be sensitive to pressure changes of short duration within the conduit 10. In other words, the plate 23 has but a small perforation for the passage of air.

The indicator will ordinarily be so adjusted that the pointer 19 is approximately midway of the scale 18 when the glass within the bell is at the desired level. If now a condition of excessive pressure is created within the bell, the pointer 19 will rise, thus signalling to the operator that the glass level within the bell is too low. On the other hand, if there is excessive suction within the bell, the pointer will move down the scale. The operator may then adjust the regulator 14 by a thumb nut 24 which is provided for that purpose, or may make the necessary change at the cam disc 16, as by substituting a disc of different contour, or he may increase or decrease the suction at the line 11.

Ordinarily, it will be sufficient, of course, to merely adjust the regulator 14, since if there is too great suction and not enough pressure, the pressure in the line 12 may be increased, while if the pressure is too great and the suction insufficient, the pressure in the line 12 can be reduced.

It will also be apparent that instead of having constant vacuum, the pressure could be made constant, and a periodically-operated valve be placed in the vacuum line. In that case, the line 12 can be the suction line, and the line 11, the pressure line.

The orifice plate in the branch pipe 22 constitutes a convenient manner of providing a restricted passageway to the bell 20. The same result could be secured by making the pipe 22 of very small diameter relative to the internal diameter of the bell, or by having a partially closed valve in the pipe. At any rate it is desirable to prevent too great movement of the bell under pressure fluctuations of short duration. Thus, there will be only a fluttering movement of the pointer 19 during the rapid pulsations in the line 10, under normal feeding conditions, because practically as soon as an appreciable pressure change takes place within the bell an opposite pressure change will be set up in the pipe 10.

Now if the durations of pressure above a predetermined degree are too long relative to the durations of pressure or suction below said degree, too much glass will be forced from the bell 9, while too prolonged durations of suction below said degree will result in the glass being drawn too far upward in the bell. As above-stated, the indicator will show when such abnormal conditions exist. Other types of indicating devices could, of course, be employed instead of the floating device 20.

Referring now to Fig. 3, I show a structure which mainly corresponds with the apparatus shown in Fig. 1. In this form of device, however, I show a manner in which suction may be created in the line 11a. The line 11a extends into a Venturi conduit 26 with which a pipe 27 communicates. A single source of pressure will be sufficient for both the pipes 12 and 27, the pressure which flows through the pipe 27 will create suction in the pipe 11a, thus avoiding the necessity for providing a suction pump in addition to a pressure pump. A valve 28 can be used for adjusting or regulating the vacuum.

The suction in the pipe 11a will, of course, be constant, and the pressure conditions in the conduit 10 will be controlled as in the structure of Fig. 1.

In order to more conveniently maintain a balanced pressure and suction condition within the bell, I have included a movable sealing device in the line 10 of Fig. 3. This sealing device may take various forms, as heretofore indicated, but is here shown as consisting of a flexible diaphragm 30, enclosed in a suitable casing with which the pipes or conduits communicate. Pressure and suction successively applied at the one side of the diaphragm, by means of the pipes 12 and 27 cause oscillation of the diaphragm, with consequent pulsations of air within the bell. There can, therefore, never be a greatly excessive quantity of air or air pressure built up within the bell, and contrariwise, no excessive suction. However, if the pressure impulses are too great relative to the suction movements in the line 11a, the glass level in the bell may be maintained at a level slightly lower than is desirable.

This would usually occur if the diaphragm were operated mainly at the right hand side of its central or neutral position. On the other hand, if the suction is too much, relative to the pressure impulses against the diaphragm, the diaphragm may operate or vibrate mainly at the left of its neutral position, with the result that the glass level in the bell may be slightly higher than desired. In either case, the pointer 19 will indicate the position of the glass level in the bell, and any adjustment to effect change in movement of the diaphragm can be effected, as above-explained.

In order to prevent undue heating of the diaphragm 30 by heated air from within the bell, I apply a cooling jacket 31, through which cooling fluid may be circulated by means of supply and exhaust pipes.

It will be understood, of course, that the diaphragm could be omitted from the structure of Fig. 3, and also apparent that it could be incorporated in the line 10 of Fig. 1.

In the accompanying claims, the term "pressure conditions" is employed in a broad sense, to signify pressures either above or below atmospheric pressure.

I claim as my invention:—

1. The combination with means for confining a pool of molten glass, including a receptacle having a discharge orifice in its bottom, of means for subjecting the confined glass to expulsive and retractive forces alternately in rapid succession, and means for indicating the cumulative effect on the glass of abnormal impulses by one force relative to the impulses of the other force.

2. The combination with means for confining a pool of molten glass, including a receptacle having a discharge orifice in its bottom, of means for creating pneumatic pulsations on the surface of the glass, the neutral level of the glass being determined by the said pulsations, and means for indicating the cumulative effect of impulses which tend to change the neutral level of the glass.

3. The combination with a receptacle for molten glass, having a discharge orifice in its bottom wall, of a bell disposed above the orifice and extending to a point below the glass level, a conduit communicating with said bell, means for creating pneumatic pulsations within the conduit and the bell, and means for indicating the duration of and extent to which a pressure condition exists to an abnormal degree as compared to an opposite pressure condition.

4. The combination with a receptacle for molten glass, having a discharge orifice in its bottom wall, of a bell disposed above the orifice and extending to a point below the glass level, a conduit communicating with said bell, means for creating pneumatic pulsations within the conduit and the bell, a gauge device having communication with said conduit, and means for damping movements of said gauge under pneumatic pulsations.

5. The combination with a receptacle for molten glass, having a discharge orifice in its bottom wall, of a bell disposed above the orifice and extending to a point below the glass level, a conduit communicating with said bell, means for creating pneumatic pulsations within the conduit and the bell, a branch pipe communicating at one end with said conduit, a bell float into which the other end of the branch pipe extends, and an indicator operated by said float, the internal diameter of the float being in excess of the passageway through the branch pipe.

6. The combination with a receptacle for molten glass, having a discharge orifice in its bottom wall, of a bell disposed above the orifice and extending to a point below the glass level, a conduit communicating with said bell, means for creating pneumatic pulsations within the conduit and the bell, a branch pipe communicating at one end with said conduit, a gauge device actuated by pulsations transmitted through the branch pipe, and means for restricting flow through the branch pipe.

7. The combination with a receptacle for molten glass, having a discharge orifice in its bottom, of an air-confining enclosure above said orifice and closed at its lower end by the glass, a movable member sealing the opposite end of said enclosure and reciprocable to effect pulsations in the enclosure, means for actuating the said member, and means for indicating variations in glass level within the enclosure.

8. The combination with a receptacle for molten glass, having a discharge orifice in its bottom, of an air-confining enclosure above said orifice and closed at its lower end by the glass, a flexible diaphragm sealing the opposite end of said enclosure and reciprocable to effect pulsations in the enclosure, means for actuating said diaphragm, and means for indicating variations in the glass level within the enclosure.

ANDREW H. STEWART.